O. H. NEBEL.
ANIMAL TRAP.
APPLICATION FILED FEB. 25, 1913.
1,083,125.
Patented Dec. 30, 1913.
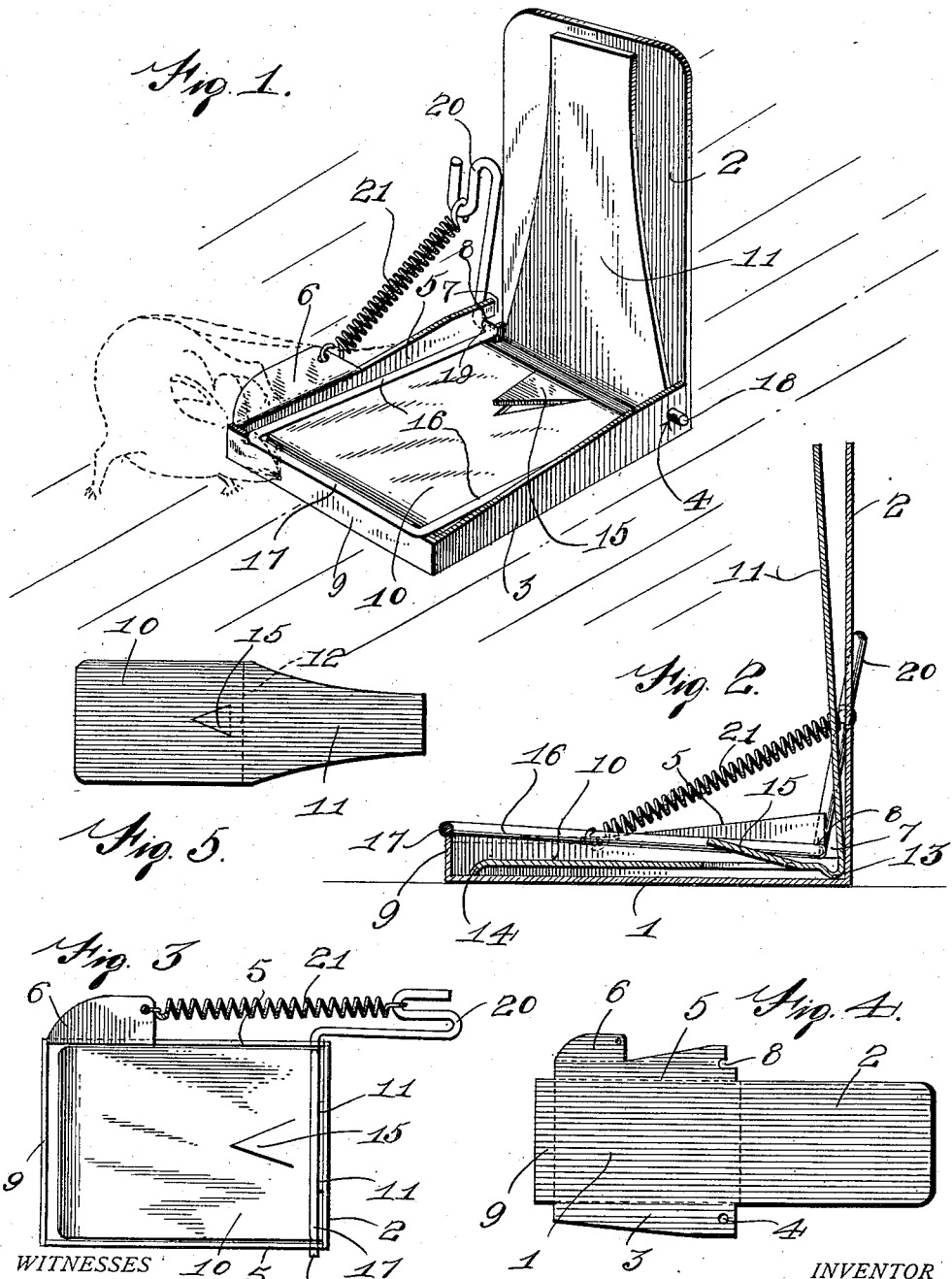

UNITED STATES PATENT OFFICE.

OSCAR H. NEBEL, OF MADISON, SOUTH DAKOTA.

ANIMAL-TRAP.

1,083,125.  Specification of Letters Patent.  Patented Dec. 30, 1913.

Application filed February 25, 1913. Serial No. 750,629.

*To all whom it may concern:*

Be it known that I, OSCAR H. NEBEL, a citizen of the United States of America, residing at Madison, in the county of Lake and State of South Dakota, have invented certain new and useful Improvements in Animal-Traps, of which the following is a specification, reference being had therein to the accompanying drawing.

This invention relates to a mouse or rat trap and has special reference to a trap which is adapted to instantly kill the animal when the same steps upon the trap.

Another object of this invention is the production of a tripping plate which is provided with a beaded portion which constitutes an efficient bearing means and also for holding the body portion of the plate from engagement with the base of the trap.

With these and other objects in view, this invention consists of certain novel combinations, constructions, and arrangement of parts, as will be hereinafter fully described and claimed.

In the accompanying drawing Figure 1, is a perspective view of the trap. Fig. 2, is a central longitudinal section of the same. Fig. 3, is a top plan view of the trap showing the same in a set position. Fig. 4, is a plan view of the blank from which the base is formed. Fig. 5, is a plan view of the blank from which the tripping plate is formed.

Referring to the accompanying drawing by numerals, it will be seen that the trap comprises a rectangular base 1, adjacent to which is formed the vertical extending back 2. The base 1 is provided upon one side with the vertical extending guarded flange 3 in which there is formed a bearing opening 4. The opposite side of the base 1 is also provided with a vertically extending flange 5 which carries the laterally extending ear 6. The end portion of this flange 5 is cut away to form an entrance opening 7 which communicates with the bearing recess 8. The forward portion of the base 1 is provided with a vertically extending cutting flange 9.

The tripping plate comprises a rectangular body 10 and a vertically extending finger 11 which is bent at an angle to the body 10 along the line 12 so as to form a beaded portion 13 for constituting an efficient bearing portion. The end portion of the body 10 is bent downwardly as illustrated at 14 whereby the body 10 will be held at a spaced distance from the base 1. This body 10 is also provided with a V-shape spur 15 which is adapted to hold the bait upon the tripping plate.

By referring to Figs. 1 and 2 it will be seen that the finger 11 is bent at such an angle relative to the body 10 as to normally be positioned at a distance from the back 2. This is accomplished by reason of the finger 11 being formed smaller than the body 10, and since the beaded portion 13 constitutes an efficient bearing portion, the weight of the body 10 will tend to draw the upper portion of the finger 11 from the face of the back 2. By spacing the body 10 from the base 1, the only portion of the tripping plate which will engage the base 1 as the plate is being swung either way, is the beaded portion 13. If the body 10 and the finger 11 were connected without the use of the beaded portion 13, the body 10 would rest squarely upon the upper portion of the base 1. In this manner if any foreign object should happen to so strike the body 10 as to bend the same, the efficiency of the pivot movement would be greatly reduced, as the pivotal movement of the same would be very difficult, since the greater portion of the body 10 would rest upon the base 1. The jaw used in connection with this device comprises a pair of parallel arms 16 which are connected by means of the bridge portion 17. One of the arms 16 is bent to form a laterally extending stub shaft 18 which fits within the bearing opening 4. The other arm 16 is provided with a bent portion 19 from which extends the portion 20. The bent portion 19 fits within the bearing recess 8 whereby the jaw will be held in pivotal engagement with the body portion of the trap. The portion 20 of the jaw is connected to the coiled spring 21 which in turn is connected to the ear 6 whereby the jaw will be normally held in a closed position. By referring to Fig. 2 it will be seen that the bridge portion 17 rests squarely upon the upper portion of the cutting flange 9 whereby when the trap is sprung the bridge portion of the jaw will so engage the cutting flange 9 as to instantly kill the animal.

In operation the device is first in the position as illustrated in Fig. 1 at which time the bait is placed upon the spur 15. The jaw is then swung upwardly whereby the spring 21 will be extended. When the jaw moves far enough back it will strike upon the upper portion of the finger 11 and will bring the finger 11 to bear upon the back 2, and in this manner the body 10 will be held in a raised position. The jaw will not spring back because the portion 20 of the jaw is in alinement with the ear 6, thereby placing the pivoted portions upon a dead center. When the animal steps upon the tripping plate, the same will pivot upon the beaded portion 13 and will in this manner swing the jaw forward. The extended portion 20 will then be moved out of alinement with the ear 6 whereby the spring will cause the same to swing downwardly so as to strike the animal in such position as to instantly kill the same, since the bridge portion will strike upon the cutting flange 9 for this purpose.

Having thus described the invention, what is claimed as new, is:

1. A trap of the class described comprising a base, a vertically extending back carried by said base, a plurality of flanges formed upon said base, a tripping plate provided with a body and an upwardly extending finger positioned upon said base, said finger normally being positioned at a distance from said back adjacent the upper portion thereof, a jaw pivoted to said base, said jaw adapted to be swung upwardly so as to move said finger into engagement with said back, a spring connecting said jaw to a portion of said base, said jaw adapted to be positioned upon a dead center when same is in a set position, and said tripping plate adapted to be moved for springing said jaw.

2. A trap comprising a base and provided with a plurality of vertically extending flanges, a vertically extending back carried by said base, a tripping plate positioned upon said base, said tripping plate comprising a body and a laterally extending finger, said back and body connected together by means of a beaded portion, the forward end of said body provided with a downwardly bent portion whereby said body will be held at a spaced distance from said base, said beaded portion constituting an efficient bearing portion for allowing the free pivotal movement of said tripping plate, a jaw carried by said base and pivotally connected thereto, means for swinging said jaw, said jaw adapted to move up to engage the upper portion of said finger, said tripping plate adapted to be moved for springing said jaw.

3. A trap comprising a base, said base provided with a plurality of vertically extending flanges, a vertically extending back carried by said base, a tripping plate carried by said base, said tripping plate comprising a body and a laterally bent finger, said finger and body connected by means of a beaded portion for constituting an efficient bearing portion, a jaw pivotally mounted upon said base, said jaw provided with a bridge portion, said bridge portion resting upon the upper portion of one of said flanges for constituting an efficient means for instantly killing the animal, said jaw provided with a means for swinging same, said jaw adapted to be sprung by means of said tripping plate.

In testimony whereof I hereunto affix my signature in presence of two witnesses.

OSCAR H. NEBEL.

Witnesses:
CHAS. E. PARKER,
H. A. VREYENS.